US012516570B2

(12) United States Patent
Brus

(10) Patent No.: US 12,516,570 B2
(45) Date of Patent: Jan. 6, 2026

(54) LADDER-MOUNTED MATERIAL LIFT

(71) Applicant: Johannes Theodorus Brus, Calgary (CA)

(72) Inventor: Johannes Theodorus Brus, Calgary (CA)

( * ) Notice: Subject to any disclaimer, the term of this patent is extended or adjusted under 35 U.S.C. 154(b) by 861 days.

(21) Appl. No.: 17/840,098

(22) Filed: Jun. 14, 2022

(65) Prior Publication Data

US 2022/0397002 A1 Dec. 15, 2022

Related U.S. Application Data

(60) Provisional application No. 63/210,895, filed on Jun. 15, 2021.

(51) Int. Cl.
*E06C 7/12* (2006.01)
*E06C 7/16* (2006.01)
*E06C 1/12* (2006.01)

(52) U.S. Cl.
CPC .................. *E06C 7/12* (2013.01); *E06C 7/16* (2013.01); *E06C 1/12* (2013.01)

(58) Field of Classification Search
CPC ................. E06C 7/12; E06C 7/16; E06C 1/12
See application file for complete search history.

(56) References Cited

U.S. PATENT DOCUMENTS 2,438,791 A * 3/1948 Russell ..................... E06C 7/16 182/103
3,666,054 A * 5/1972 Ellings ...................... E06C 7/16 187/241
4,546,853 A * 10/1985 Hanson ..................... E06C 7/16 182/103
5,139,108 A * 8/1992 Pate .......................... E06C 7/12 182/108
6,244,381 B1 * 6/2001 Ruble ....................... E06C 7/12 182/103
7,424,932 B1 * 9/2008 Murphy .................. E06C 1/345 182/103
7,900,745 B1 * 3/2011 Tindal ....................... E06C 7/16 182/103
8,074,769 B2 * 12/2011 Sracic ....................... E06C 1/12 182/103
8,689,937 B2 * 4/2014 Grado ....................... E06C 7/16 182/103
9,856,697 B2 * 1/2018 Reyes ....................... E06C 7/12
10,563,457 B2 * 2/2020 West ......................... E06C 7/48
2014/0246271 A1 * 9/2014 Davies ...................... E06C 7/48 182/103
2015/0300090 A1 * 10/2015 Strand ....................... E06C 7/12 182/103
2020/0102789 A1 * 4/2020 Young ....................... E06C 1/12

* cited by examiner

*Primary Examiner* — David E Martinez
(74) *Attorney, Agent, or Firm* — Spencer Fane, LLP

(57) ABSTRACT

A ladder-mountable material lift for mounting on an extension ladder, having a hoist for engaging with an upper rung of the extension ladder and a platform moveable by the hoist between a lower end of the extension ladder and the hoist. The platform has upper and lower side brackets on each side of the platform, the lower side brackets for sliding along upper surfaces of the side rails of the ladder base section and the upper side brackets for sliding along upper surfaces of the side rails of the ladder fly section, such that operation of the hoist causes the platform to move upwardly or downwardly along the extension ladder.

11 Claims, 13 Drawing Sheets

LADDER-MOUNTED MATERIAL LIFT

TECHNICAL FIELD OF THE INVENTION

The present invention relates to devices and systems for moving materials between different elevations, and more particularly to a material lift for use with an extension ladder.

BACKGROUND OF THE INVENTION

In various industries including residential and commercial construction, extension ladders have become ubiquitous for their utility in allowing users to reach work areas of different heights. For example, the roofing industry requires workers to access roof surfaces of varying heights, and a standard extension ladder allows the worker to set the height of the extension ladder as appropriate for accessing the work area. A standard extension ladder comprises a base section and a fly section, each with paired side rails and rungs therebetween, with rung locks to lock the fly section relative to the base section when a desired extension has been set.

While such extension ladders allow workers to access elevated work areas, the safety requirement of maintaining three-point contact with the ladder generally means that materials such as roofing materials must be moved to the work area in a different way. Various methods including the use of hydraulic hoists and boom lifts are available to safely lift materials to the roof, but workers often carry material while climbing the ladder despite the safety concerns due to the cost and inconvenience of conventional equipment.

Some prior art systems have been developed using standard extension ladders as the basis for material lifting systems. For example, rope-and-pulley systems are known for pulling material up the ladder surface, but the inherent instability of such systems and the risk of falling materials during lifting is undesirable. In some other examples, lifting platforms travel along the ladder from the ground to the work area, but they generally require significant customization of the ladder itself or even replacement of some ladder components with customized parts, again introducing undesirable cost.

What is needed, therefore, is a simple and easy-to-install material lifting device and system that can be used with standard extension ladders requiring little or no ladder customization or modification, while allowing workers to ascend the ladder using three-point contact.

SUMMARY OF THE INVENTION

According to a first broad aspect of the present invention, there is provided a ladder-mountable material lift, the material lift selectively mountable on an extension ladder, the extension ladder comprising a base section and a fly section, the base section and the fly section each comprising side rails and rungs therebetween, the material lift comprising:

- a hoist configured for selective engagement with an upper rung of the extension ladder, the hoist comprising an extendable and retractable connection member; and
- a material-supporting platform selectively connectable to the connection member for movement between a lower end of the extension ladder and the hoist;
- the platform comprising upper and lower side brackets on each side of the platform: the lower side brackets configured for slidable engagement with upper surfaces of the side rails of the base section; and the upper side brackets configured for slidable engagement with upper surfaces of the side rails of the fly section;
- such that operation of the hoist causes the platform to move upwardly or downwardly along the extension ladder.

In some exemplary embodiments of the first broad aspect of the present invention, the hoist comprises at least one securing pin for insertion through a hole in the side rail of the fly section when the hoist is engaged with the upper rung. The hoist may further comprise at least one strap configured for attachment to a user allowing the user to ascend the extension ladder while carrying the hoist to the upper rung. The hoist is preferably powered by a motor, and the motor may be controllable by a remote control unit.

The connection member is preferably a steel cable. The platform preferably comprises a base and a support, the base for receiving material for transport and the support for adjusting an angle of the base. In some embodiments the base comprises a floor and a peripheral wall.

The side brackets preferably comprise a polymer for slidable engagement with the side rails.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Figure 1:
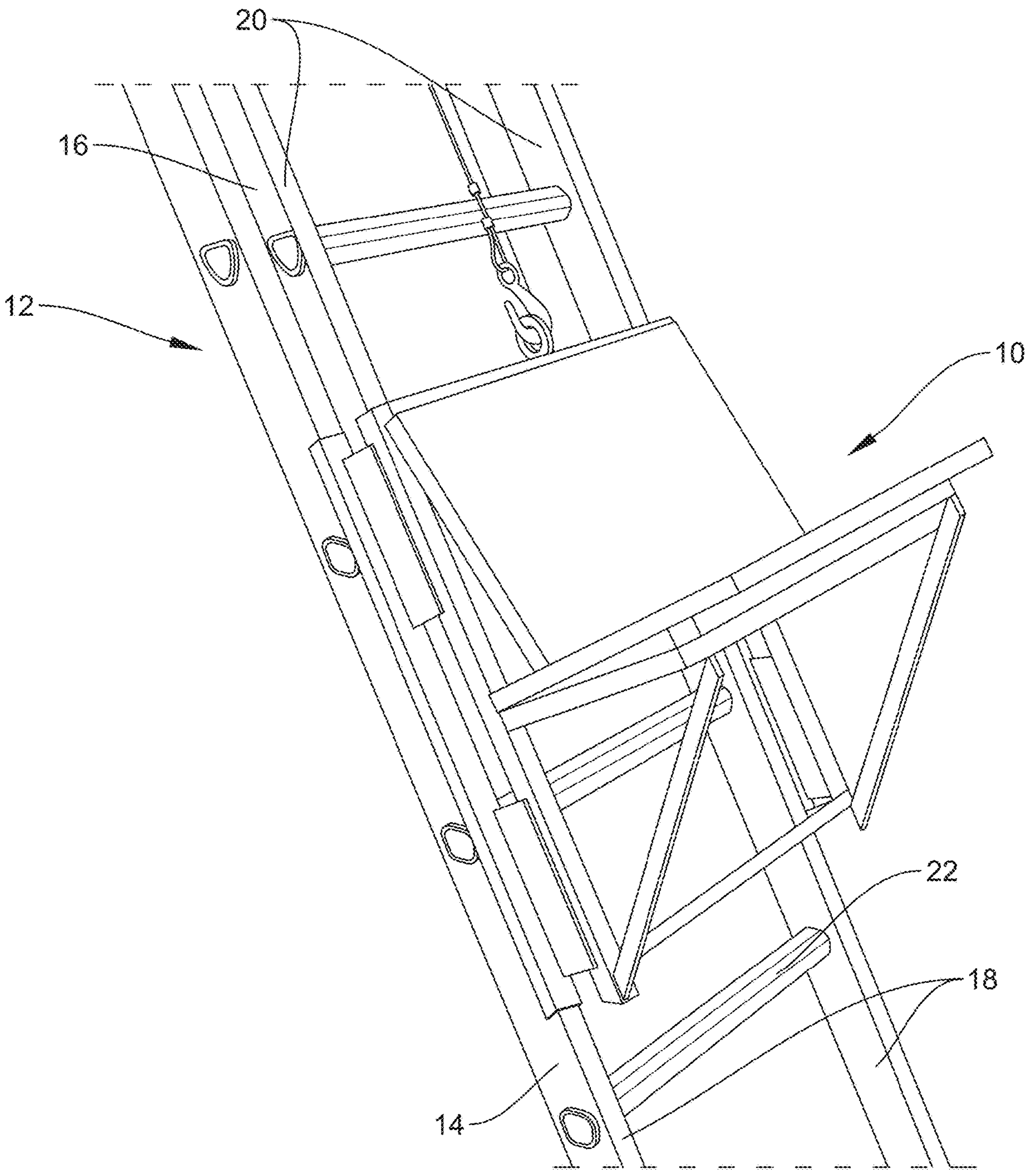
FIG. 1 is a view of an exemplary platform engaging a ladder while supported by a connection member.
Figure 2:
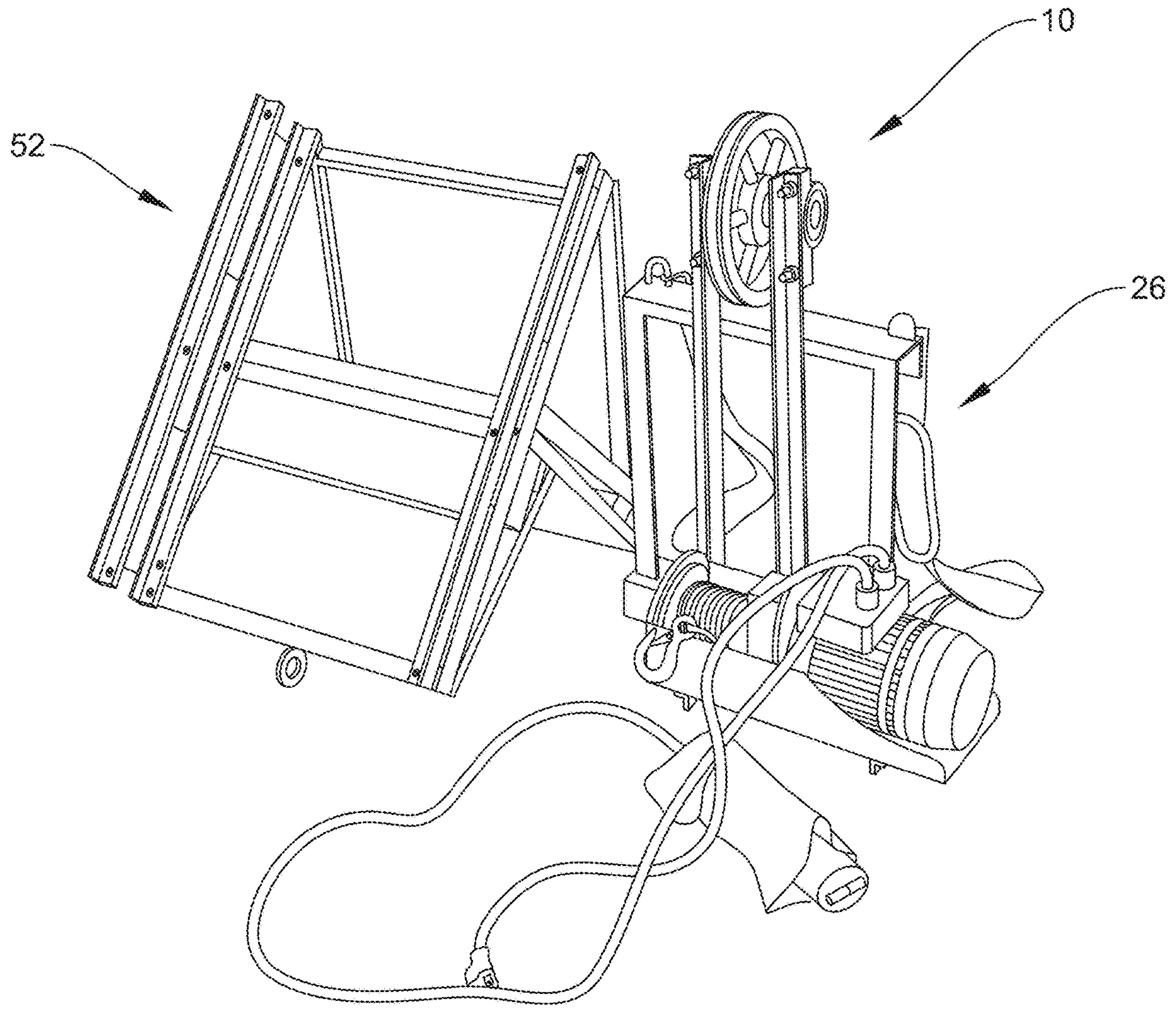
FIG. 2 is a view of a disconnected hoist and platform.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense.

The present invention is directed to a device and system for transporting material on a platform that is pulled along an extension ladder surface by a hoist, to either lift the material to an elevated work area like a roof or to lower the material to a lower end of the ladder near the ground.

Turning now to FIGS. 1 to 5, a material lift 10 is shown in perspective view, the material lift 10 shown mounted on a conventional extension ladder 12. The ladder 12 comprises a base section 14 and a fly section 16, the base section 14 comprising base section side rails 18 with rungs 22 therebetween and the fly section 16 comprising fly section side rails 20 with rungs 22 therebetween.

Figure 3:
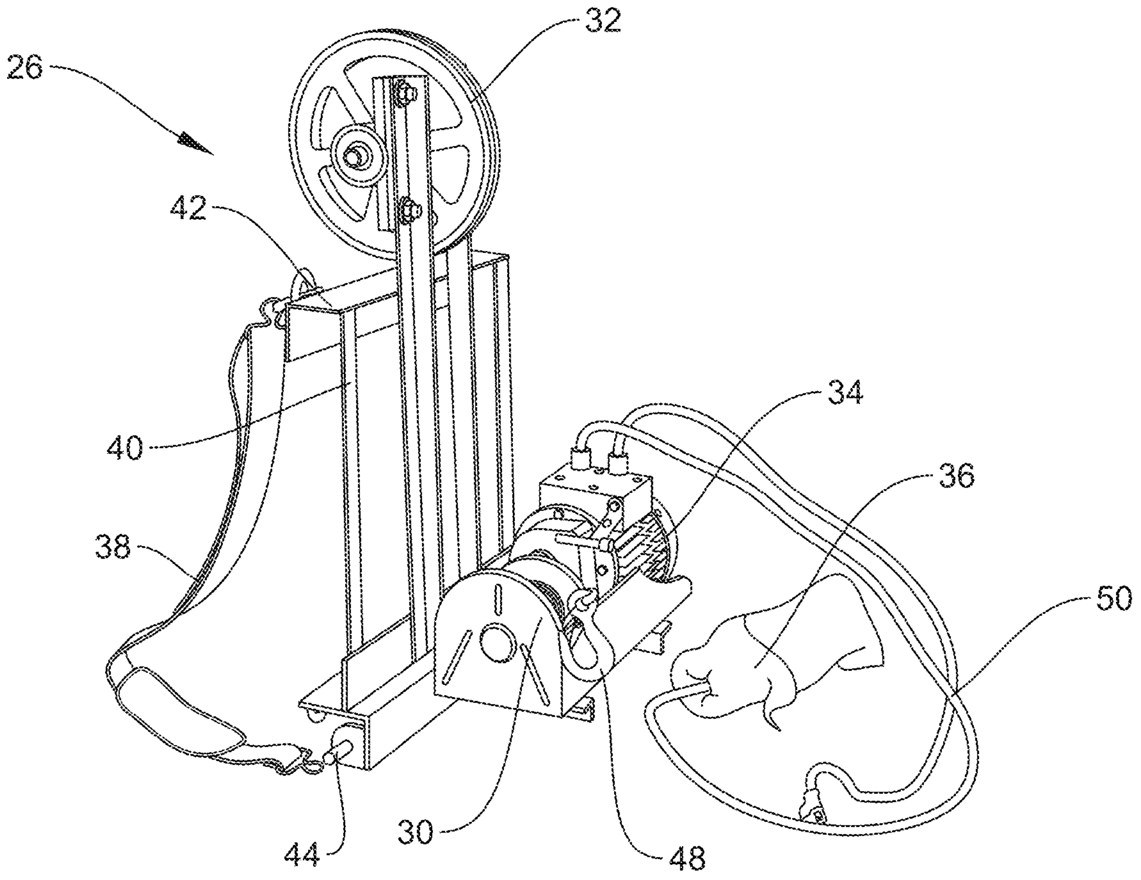
FIGS. 3 and 4 are views of a hoist.
Figure 4:
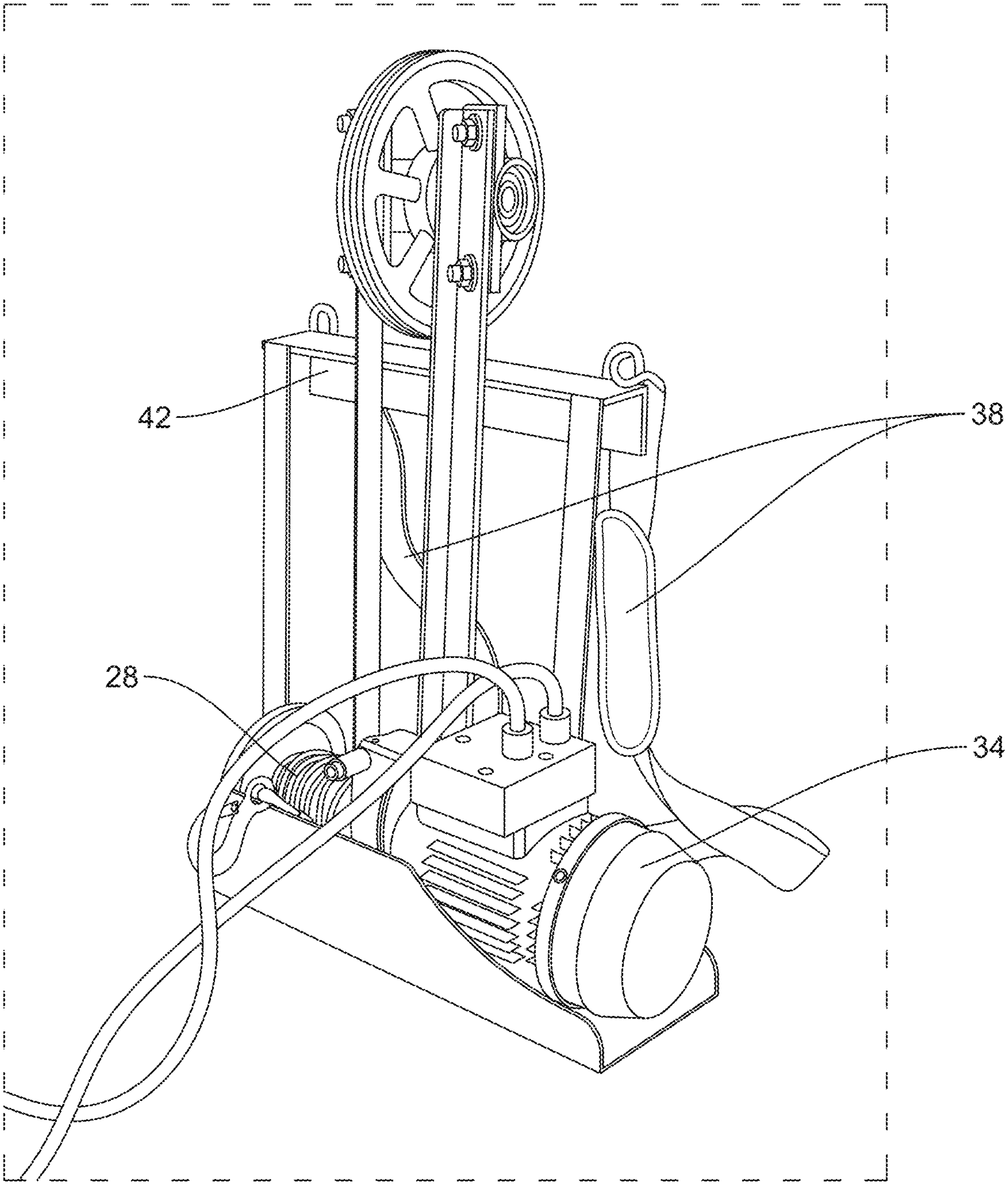

As can best be seen in FIGS. 3 and 4, the material lift 10 comprises a hoist 26. The hoist 26 comprises a frame 40 which supports a cable spindle 30 (on which a cable 28 is wound, the cable 28 terminating with a hook 48), a pulley 32 over which the cable 28 will be run for operation, a motor 34 for powering the cable spindle 30 for extension and retraction of the cable 28, and an upper mounting bracket 42 configured for mounting on an upper rung 24 of the ladder in operation, as described below.

The motor 34 is preferably powered by a power cord 50 (though other power means such as batteries may be used with certain embodiments) and controlled by a remote control unit 36, which in the illustrated embodiment is connected by a cord to the motor but could also be of wireless configuration as would be within the knowledge of the skilled person.

The frame 40 also supports backpack-type straps 38. Such straps 38 can be positioned over the shoulders of a user, enabling the user to carry the hoist 26 (disconnected from the platform 52) up the ladder 12 for mounting at a top of the ladder 12, such that the user can ascend the ladder 12 while maintaining three-point contact for safety purposes.

Figure 5:
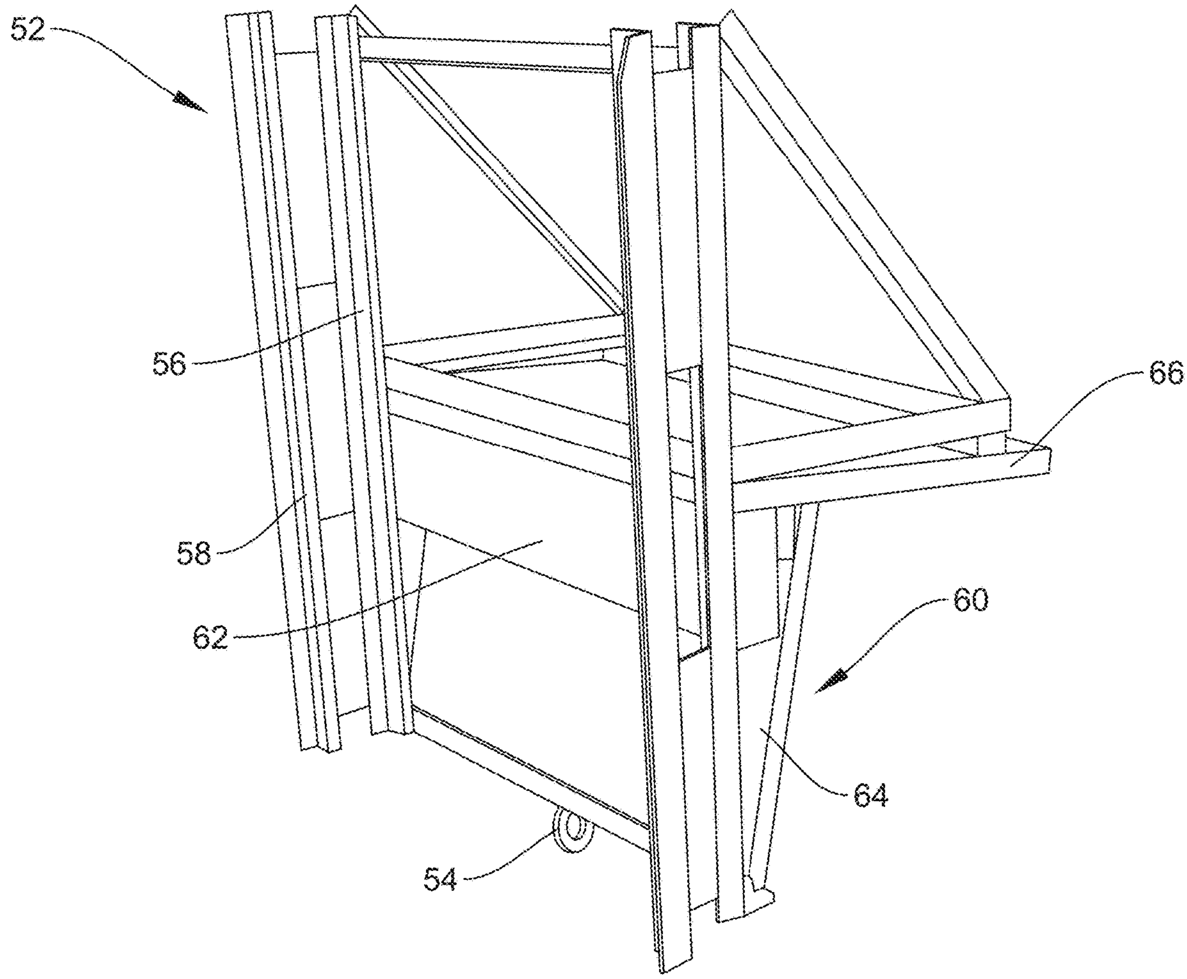
FIG. 5 is a view of a platform.

Turning to FIGS. 1 and 5, the platform 52 is illustrated in detail in upright and inverted orientations, respectively. The platform 52 comprises side members that include upper side brackets 56 and lower side brackets 58, which are configured for slidable engagement with the fly section side rails 20 and the base section side rails 18, respectively, as described below. As will be clear to those skilled in the art, the width of the platform 52 can be made in different widths or be adjustable to fit different ladder 12 widths, so that the upper side brackets 56 and lower side brackets 58 can slidably engage the fly section side rails 20 and the base section side rails 18. For retaining material 68 for transport, the platform 52 comprises a base 60, which base 60 can be angled as desired by use of a support 62. The base 60 comprises a floor 64 and a wall 66 for retaining the material 66. Finally, the platform 52 comprises an eye 54 configured for connection to the hook 48 of the cable 28 to allow the hoist 26 to move the platform 52.

Figure 6A:
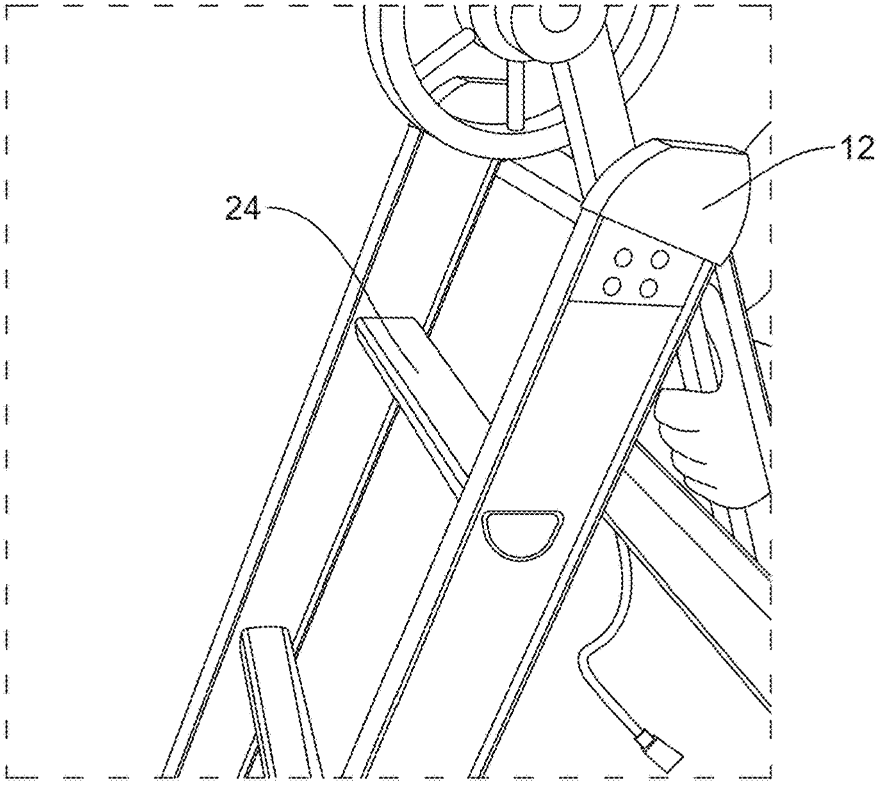
FIGS. 6*a* to 6*d* illustrate the steps of mounting the hoist on an upper rung of the extension ladder.
Figure 6B:
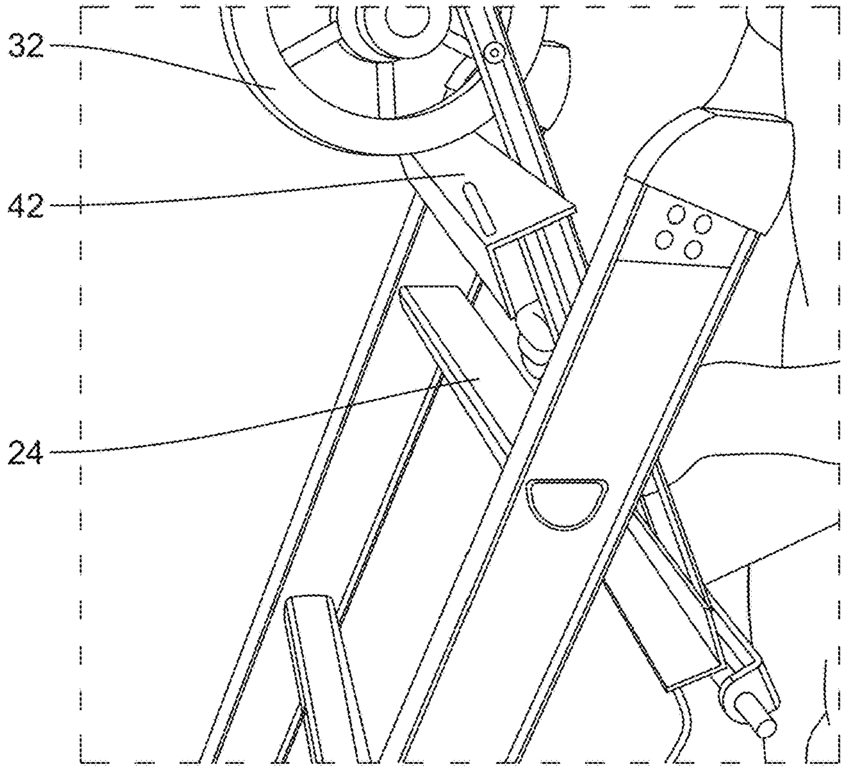
Figure 6C:
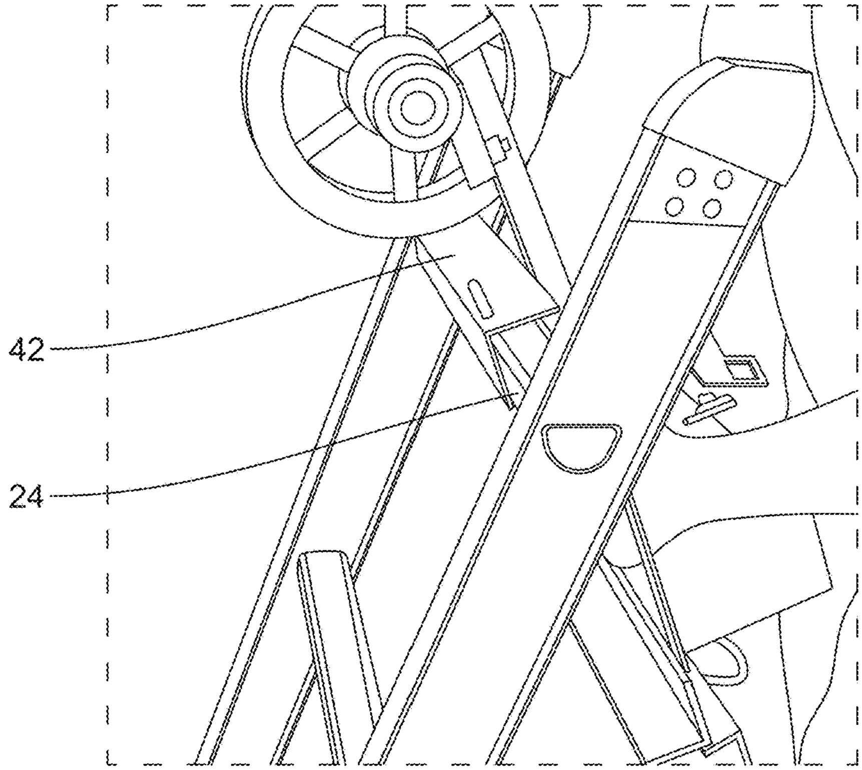
Figure 6D:
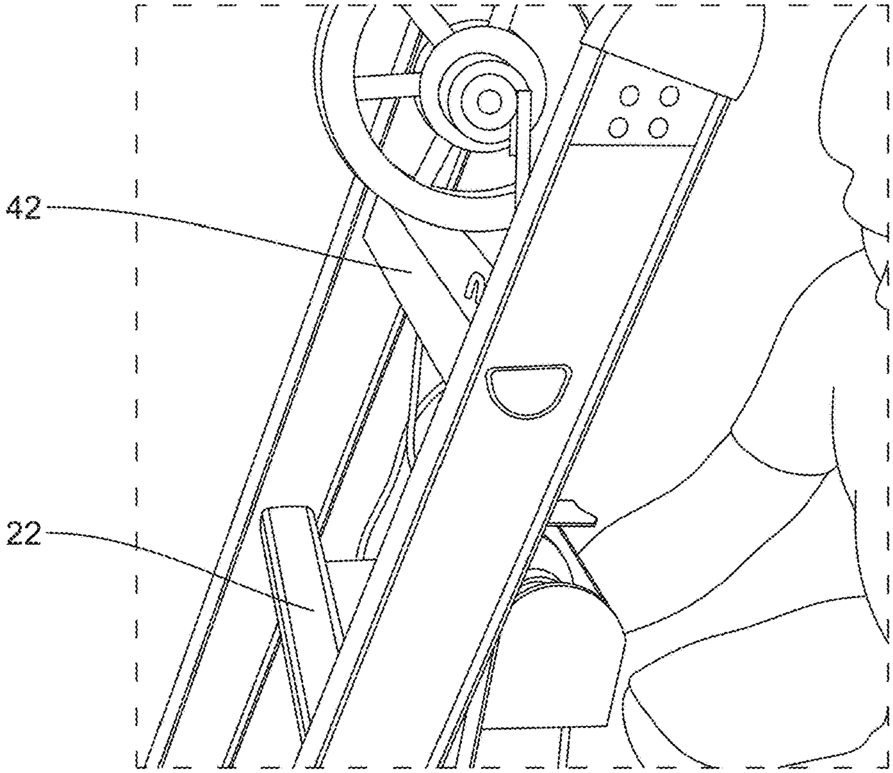
Figure 7:
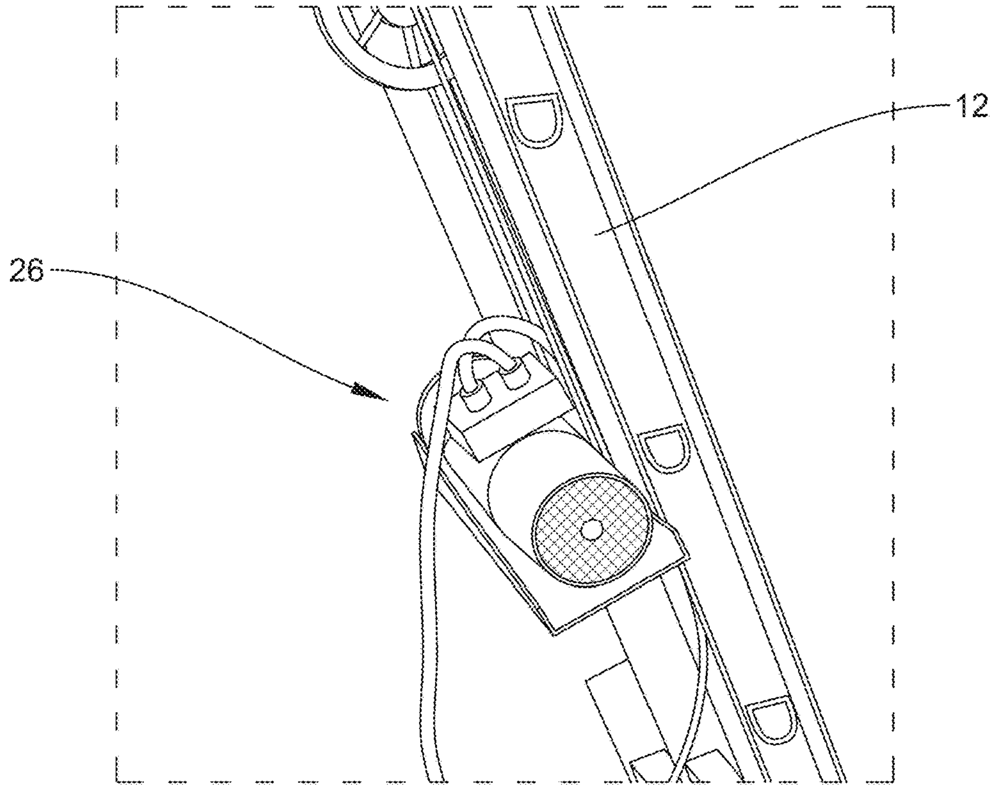
FIG. 7 is a rear view of the hoist mounted on the ladder.

Turning now to FIGS. 6*a* to 6*d*, the steps in mounting the hoist 26 on the upper rung 24 of the ladder 12 are illustrated. The ladder 12 is preferably already in place to allow the user to access the elevated work space, and the user would have used the straps 38 to carry the hoist 26 up the ladder 12. Once at the elevated work space, the user can then move the hoist 26 toward the upper rung 24 of the ladder 12, as shown in FIG. 6*a*. The upper mounting bracket 42 is then moved over the upper rung 24 (FIG. 6*b*) and lowered onto the upper rung 24 for engagement (FIG. 6*c*). The frame 40 is then rotated against the back of the ladder 12 as shown in FIG. 6*d* and FIG. 7.

Figure 8A:
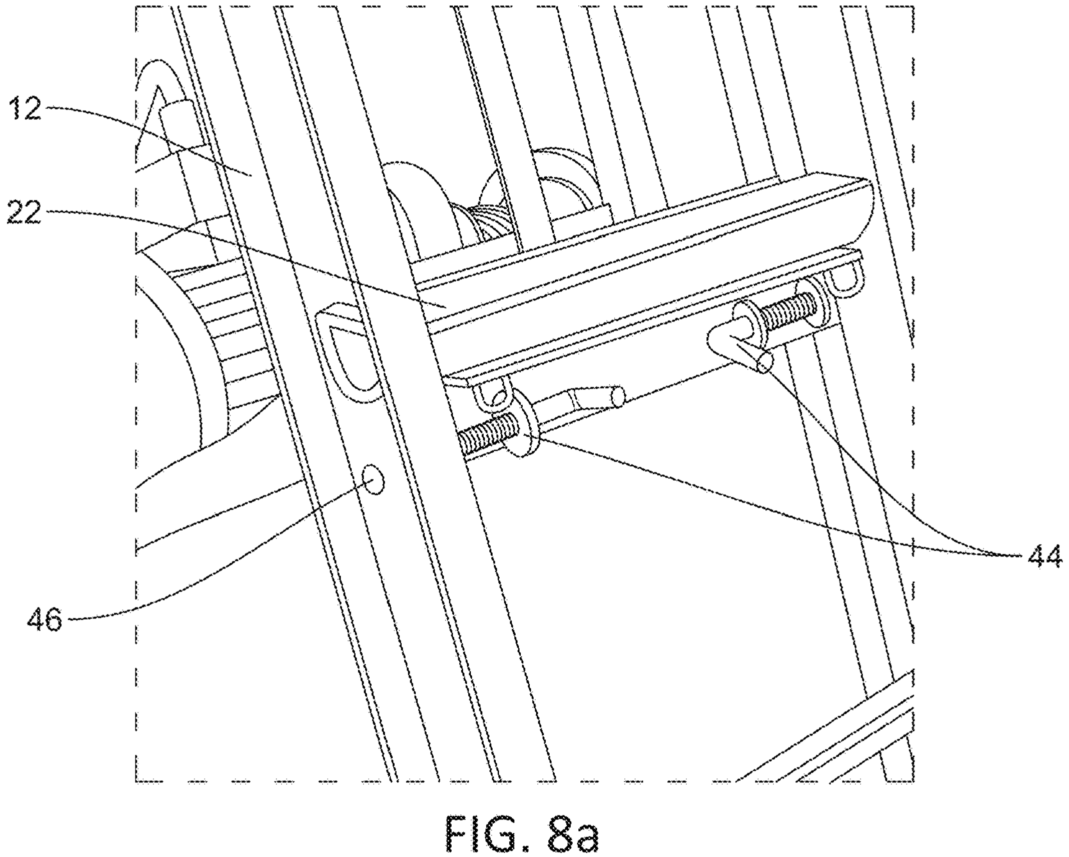
FIG. 8*a* to *b* show details of hoist securing pins.
Figure 8B:
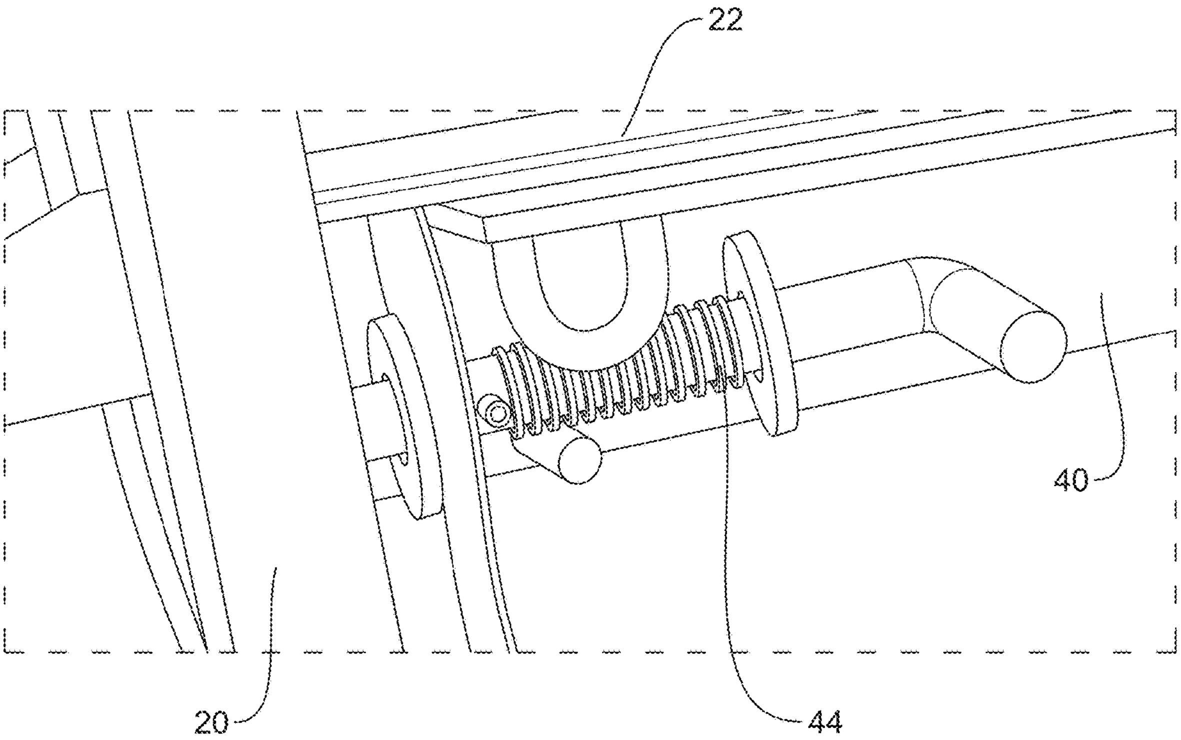

Turning to FIGS. 8*a* and 8*b*, an exemplary mechanism for securing the frame 40 against the ladder 12 is illustrated. Note that this is an optional feature, and it can be eliminated if the user does not desire to modify the ladder 12, as the unsecured upper mounting bracket 42 alone may be sufficient to retain the hoist 26 on the upper rung 24. As can be seen, a lower end of the frame 40 is positioned beneath a rung 22 and comprises spring-loaded pins 44 that can be moved inwardly against the springs. The fly section side rails 20 are provided with holes 46 configured for receipt of the pins 44, such that when the frame 40 is rotated against the back of the ladder 12 the pins 44 can be moved inwardly and then allowed to extend into the holes 46 when the pins 44 are aligned with the holes 46. In this way, the bottom end of the frame 40 is secured against the ladder 12 while the upper bracket 42 is positioned over the upper rung 24.

Figure 9A:
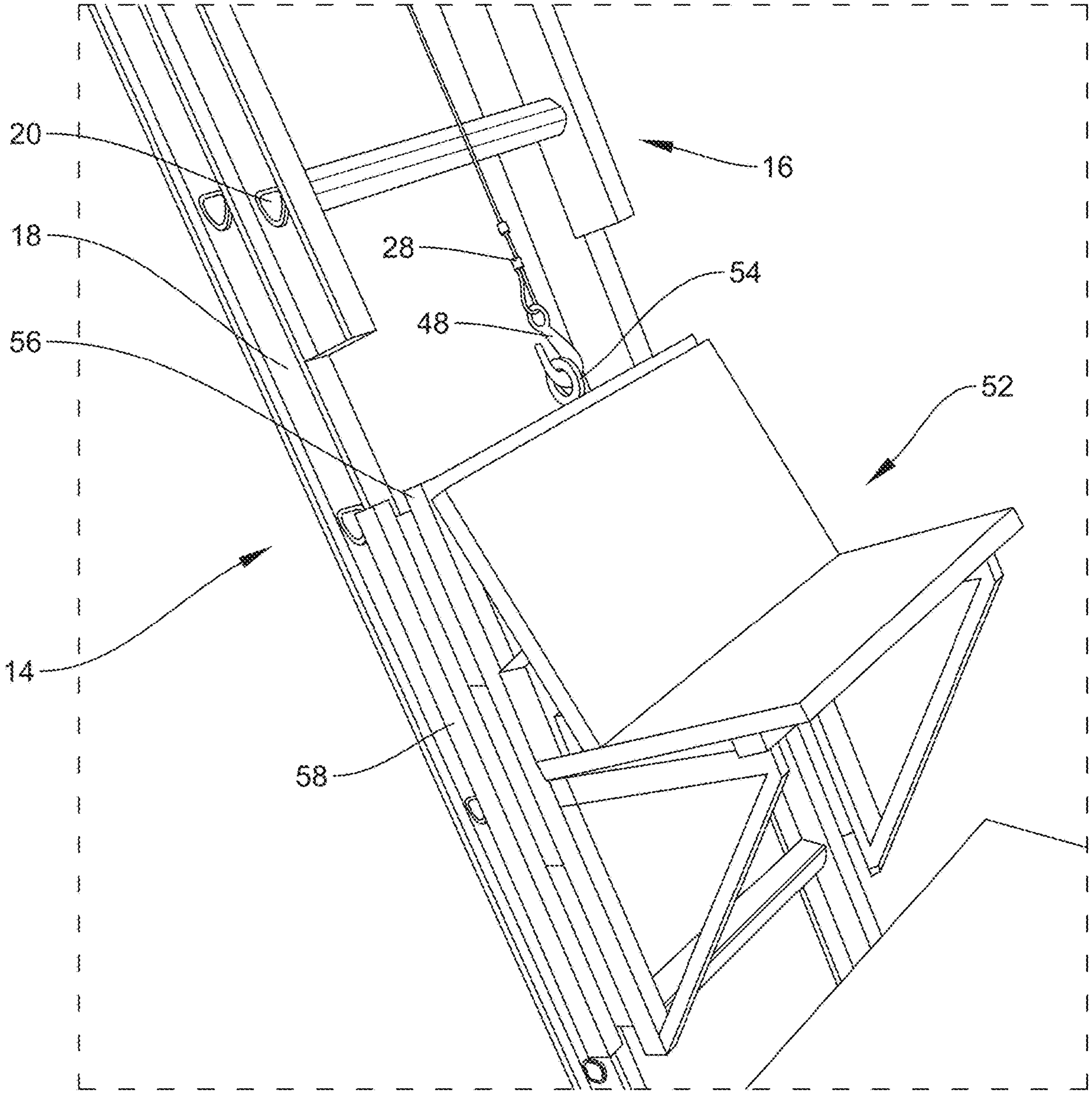
FIGS. 9*a* to 9*d* illustrate movement of the platform upwardly while engaging the base section, both the base and fly sections, and finally the fly section alone.
Figure 9B:
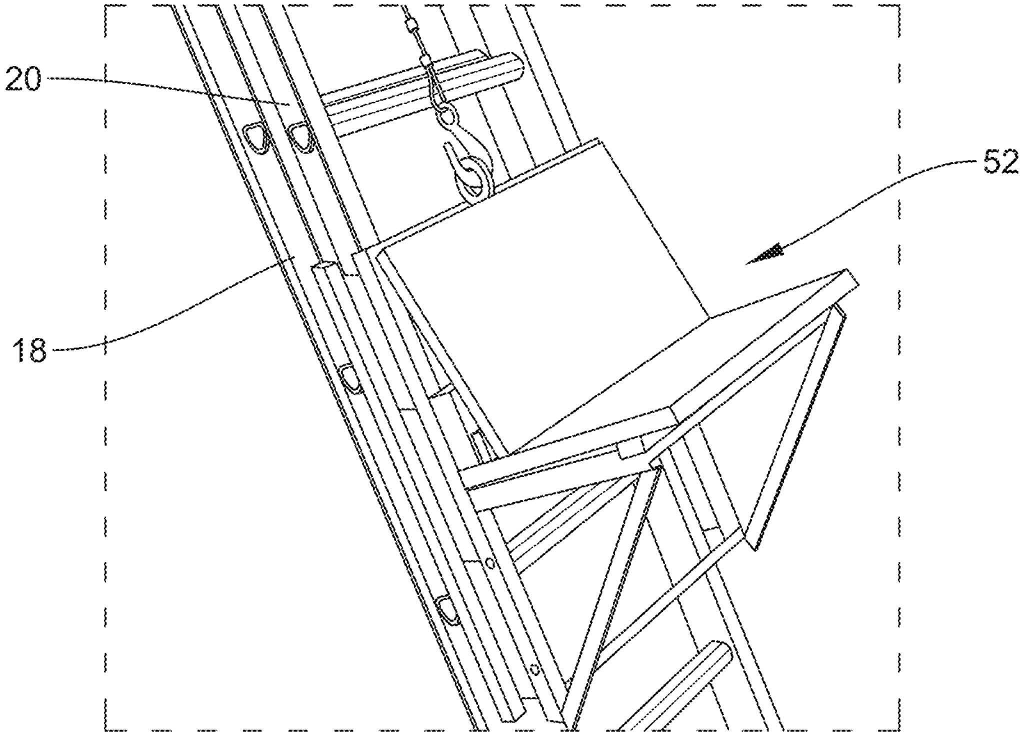

Turning now to FIGS. 9*a* to 11, operation of the exemplary material lift 10 is illustrated. Once the hoist 26 is mounted to the top of the ladder 12 as described above, the motor 34 is operated by the remote control unit 36 to extend the cable 28 downwardly toward the ground. The lower side brackets 58 of the platform 52 are positioned on top of upper surfaces of the base section side rails 18 for slidable engagement therewith, as shown in FIG. 9*a*, and the hook 48 of the cable 28 is connected to the eye 54 of the platform 52. The motor 34 can then be used to begin retracting the cable 28 by winding the cable 28 onto the spindle 30, thus moving the platform 52 upwardly along the ladder 12 with the platform 52 approaching the fly section side rails 20 (FIG. 9*b*).

Figure 9C:
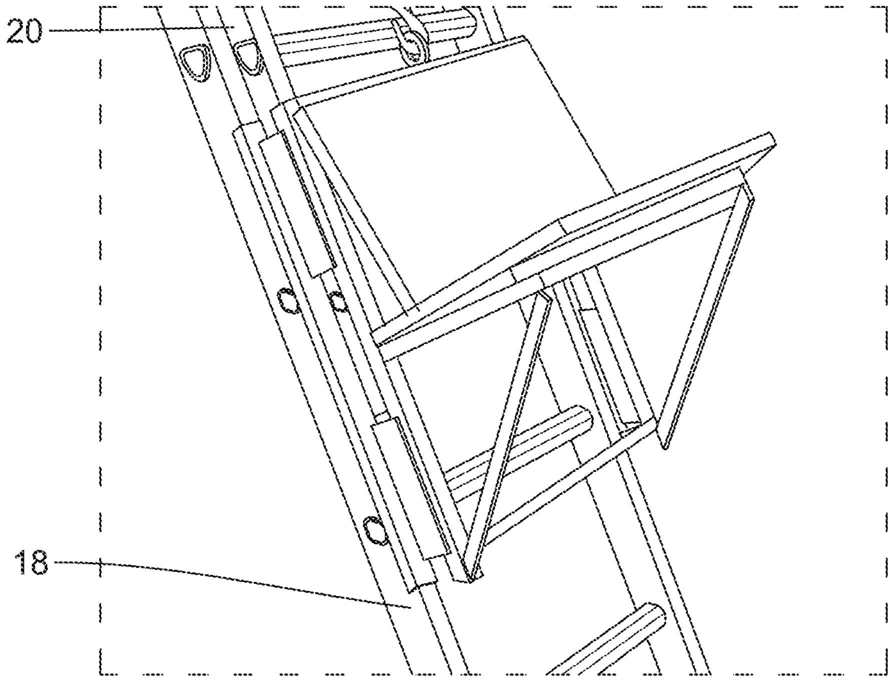
Figure 9D:
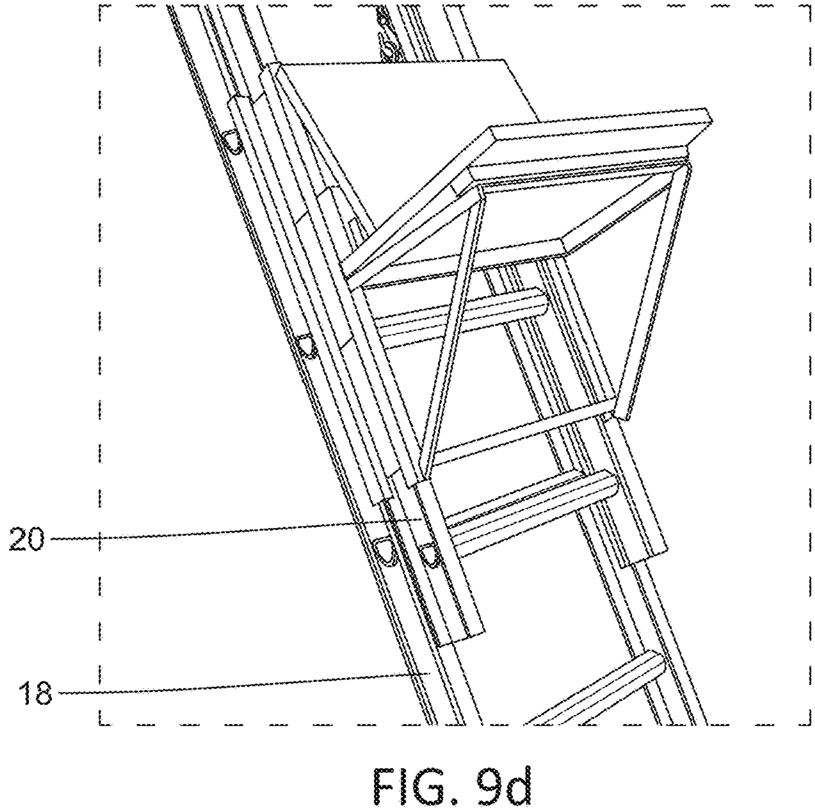

As the platform 52 is moved upwardly, it engages the fly section side rails 20 while still engaged with the base section side rails 18. As can be seen in FIG. 9*c*, the lower side brackets 58 are still slidably engaged with the upper surfaces of the base section side rails 18 as the upper side brackets 58 begin to slidably engage the upper surfaces of the fly section side rails 20. The platform 52 thereby is able to continue smoothly moving up the ladder 12 without experiencing any jolting of the platform 52 from the shift between the base section 14 and the fly section 16. The platform 52 subsequently engages only the fly section side rails 20 as it progresses upwardly as shown in FIG. 9*d*.

Figure 10A:
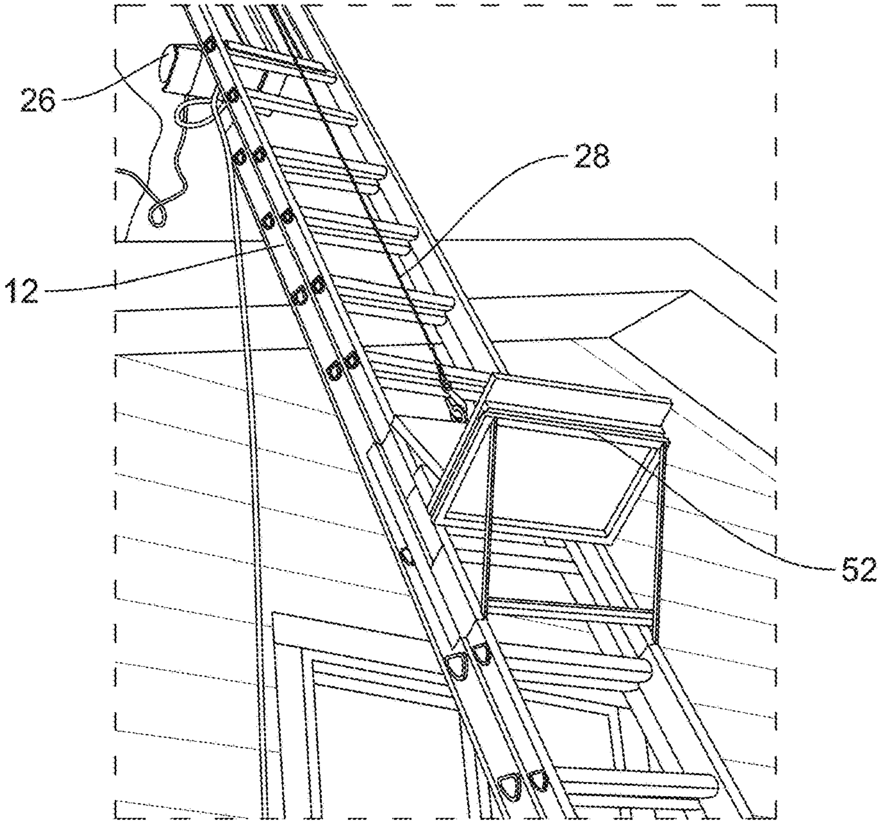
FIGS. 10*a* to 10*b* illustrate the platform approaching the hoist and then arriving at the hoist.
Figure 10B:
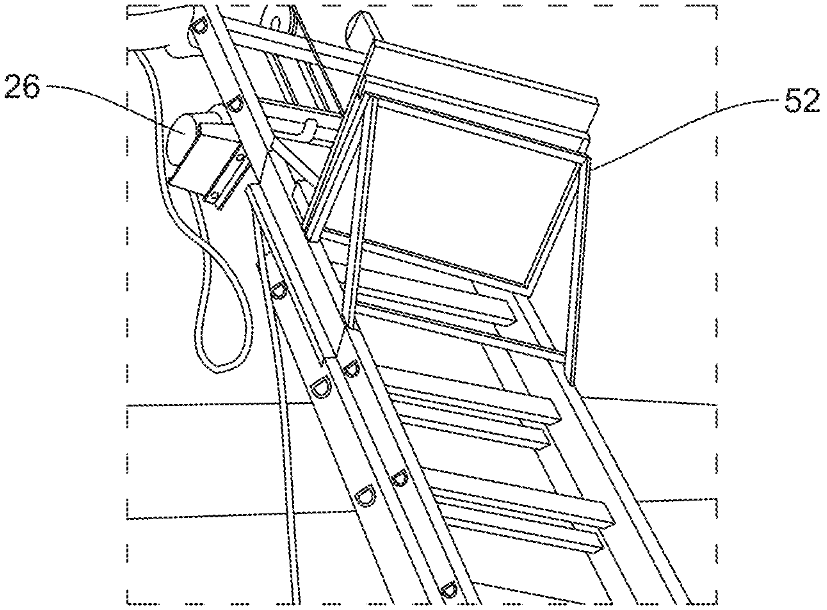
Figure 11:
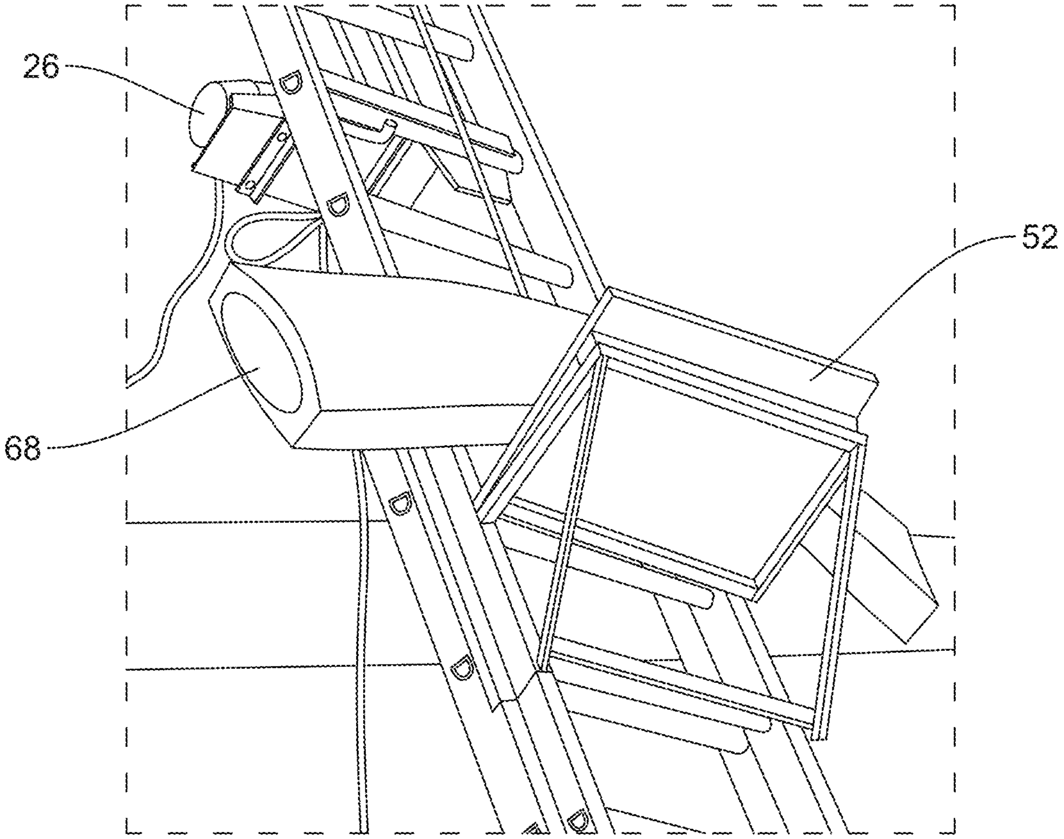
FIG. 11 shows the platform transporting material.

FIGS. 10*a* and 10*b* show the platform 52 being pulled upwardly along the ladder 12 by the hoist 26, and FIG. 11 shows material 66 being transported on the platform 52. When the platform 52 reaches the hoist 26 it can either be stopped manually using the remote control unit 36 or by incorporating conventional stops or other similar devices. The frame 40 may further comprise anchoring means for securing it to the elevated work surface until it is desired to detach the hoist 26 from the ladder for descent to the ground surface.

The foregoing is considered as illustrative only of the principles of the present invention. The scope of the claims should not be limited by the exemplary embodiments set forth in the foregoing, but should be given the broadest interpretation consistent with the specification as a whole.

The invention claimed is:

1. A ladder-mountable material lift, the material lift selectively mountable on an extension ladder, the extension ladder comprising a base section and a fly section, the base section and the fly section each comprising side rails and rungs therebetween, the sections overlapping at an overlapping portion, with one of the sections overlying an other of the sections at the overlapping portion, the material lift comprising:

a hoist configured for selective engagement with an upper rung of the extension ladder, the hoist comprising an extendable and retractable connection member; and a material-supporting platform selectively connectable to the connection member for movement between a lower end of the extension ladder and the hoist;

the platform comprising laterally opposed first and second sides, each of the first and second sides comprising vertically spaced-apart upper and lower side brackets, the upper and lower side brackets extending in a direction parallel to a longitudinal axis of the extension ladder:

the upper side brackets of the first and second sides configured for slidable engagement along upper surfaces of the side rails of the one of the sections;

the lower side brackets of the first and second sides configured for slidable engagement along upper surfaces of the side rails of the other of the sections; and the upper and lower side brackets of each of the first and second sides configured for simultaneous slidable engagement with the upper surfaces of the side rails of the sections when moving along the overlapping portion;

such that operation of the hoist causes the platform to move upwardly or downwardly along the extension ladder.

2. The material lift of claim 1 wherein the hoist comprises at least one securing pin for insertion through a hole in the side rail of the fly section when the hoist is engaged with the upper rung.

3. The material lift of claim 1 wherein the hoist further comprises backpack-type straps configured for wearing by a user allowing the user to ascend the extension ladder while carrying the hoist to the upper rung.

4. The material lift of claim 1 wherein the hoist is powered by a motor.

5. The material lift of claim 4 wherein the motor is controllable by a remote control unit.

6. The material lift of claim 1 wherein the connection member is a steel cable.

7. The material lift of claim 1 wherein the platform comprises a base and a support, the base for receiving material for transport and the support for adjusting an angle of the base.

8. The material lift of claim 7 wherein the base comprises a floor and a peripheral wall.

9. The material lift of claim 1 wherein the upper and lower side brackets comprise a polymer for slidable engagement with the side rails.

10. A ladder-mounted material lift system for transporting material between vertically spaced apart locations, the system comprising:

an extension ladder comprising a base section and a fly section, the base section and the fly section each comprising side rails and rungs therebetween, the sections overlapping at an overlapping portion, with one of the sections overlying an other of the sections at the overlapping portion;

a hoist selectively engaged with an upper rung of the extension ladder, the hoist comprising an extendable and retractable connection member; and a material-supporting platform selectively connected to the connection member for movement between a lower end of the extension ladder and the hoist;

the platform comprising laterally opposed first and second sides, each of the first and second sides comprising vertically spaced-apart upper and lower side brackets, the upper and lower side brackets extending in a direction parallel to a longitudinal axis of the extension ladder:

the upper side brackets of the first and second sides slidably engaged with upper surfaces of the side rails of the one of the sections for travel therealong;

the lower side brackets of the first and second sides slidably engaged with upper surfaces of the side rails of the other of the sections for travel therealong; and the upper and lower side brackets of each of the first and second sides simultaneously slidably engaged with the upper surfaces of the side rails of the sections when moving along the overlapping portion;

such that operation of the hoist causes the platform to move upwardly or downwardly along the extension ladder.

11. A material lift for an extension ladder comprising first and second sections, the first and second sections each comprising side rails, with one of the sections overlying an other of the sections at an overlapping portion, the material lift comprising:

a hoist engageable with an upper rung of the extension ladder, the hoist comprising an extendable and retractable connection member; and a material-supporting platform connectable to the connection member for movement between a lower end of the extension ladder and the hoist;

the platform comprising opposed lateral sides, each of the lateral sides comprising upper and lower engagement surfaces extending parallel to a longitudinal axis of the extension ladder:

the upper engagement surfaces configured for slidable engagement along upper surfaces of the side rails of the one of the sections and the lower engagement surfaces configured for slidable engagement along upper surfaces of the side rails of the other of the sections; and the upper and lower engagement surfaces configured for simultaneous slidable engagement with the upper surfaces of the side rails of the sections when moving along the overlapping portion.

* * * * *